(12) United States Patent
Hu et al.

(10) Patent No.: US 12,131,043 B2
(45) Date of Patent: Oct. 29, 2024

(54) METHOD AND MEMORY CONTROLLER FOR ACCESSING MULTIPLE MEMORIES

(71) Applicant: RAYMX Microelectronics Corp., Anhui Province (CN)

(72) Inventors: Zhao-Yao Hu, Anhui Province (CN); Shuai Lin, Anhui Province (CN); Zhi-Fan Liang, Anhui Province (CN)

(73) Assignee: RAYMX MICROELECTRONICS CORP., Anhui Province (CN)

( * ) Notice: Subject to any disclaimer, the term of this patent is extended or adjusted under 35 U.S.C. 154(b) by 0 days.

(21) Appl. No.: 18/356,281

(22) Filed: Jul. 21, 2023

(65) Prior Publication Data
US 2024/0241658 A1 Jul. 18, 2024

(30) Foreign Application Priority Data
Jan. 17, 2023 (CN) .......................... 202310086360.7

(51) Int. Cl.
*G06F 3/06* (2006.01)
(52) U.S. Cl.
CPC ............ *G06F 3/064* (2013.01); *G06F 3/0622* (2013.01); *G06F 3/0683* (2013.01)
(58) Field of Classification Search
CPC ...... G06F 3/064; G06F 3/0622; G06F 3/0683; G06F 3/0604; G06F 3/061; G06F 3/0629; G06F 3/0689; Y02D 10/00
USPC .................................................. 711/154, 100
See application file for complete search history.

(56) References Cited

U.S. PATENT DOCUMENTS

| 11,545,223 | B2 | 1/2023 | Sakurada et al. |
| 2012/0059978 | A1 | 3/2012 | Rosenband et al. |
| 2013/0074178 | A1 | 3/2013 | Sobol et al. |
| 2020/0201570 | A1* | 6/2020 | Kim ........................ G06F 12/10 |

FOREIGN PATENT DOCUMENTS

| CN | 102193870 A | 9/2011 |
| TW | I717953 B | 2/2021 |
| TW | I770734 B | 7/2022 |

* cited by examiner

*Primary Examiner* — David Yi
*Assistant Examiner* — Zubair Ahmed
(74) *Attorney, Agent, or Firm* — McClure, Qualey & Rodack, LLP (57) ABSTRACT

A method and a memory controller for accessing a plurality of memories are provided. The method includes sorting a plurality of blocks of a plurality of memories to correspond to a plurality of disk logical addresses that are sequentially sorted. The plurality of blocks of the plurality of memories include M first blocks of a first memory and N second blocks of a second memory, where M and N are each an integer greater than 1, and the M first blocks of the first memory and the N second blocks of the second memory in the plurality of disk logical addresses are sorted in a non-sequential successive order.

16 Claims, 8 Drawing Sheets executing a sorting operation to sort the plurality of blocks of the plurality of memories to correspond to a plurality of disk logical addresses that are sequentially sorted, and the M first blocks of the first memory and the N second blocks of the second memory in the plurality of disk logical addresses being sorted in a non-sequential successive order — S201 executing a writing operation or a reading operation according to a result of the sorting operation, so as to access the first memory and the second memory — S202

METHOD AND MEMORY CONTROLLER FOR ACCESSING MULTIPLE MEMORIES

CROSS-REFERENCE TO RELATED PATENT APPLICATION

This application claims the benefit of priority to China Patent application Ser. No. 202310086360.7, filed on Jan. 17, 2023 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method and a memory controller, and more particularly to a method and a memory controller for accessing a plurality of memories.

BACKGROUND OF THE DISCLOSURE

A host can access multiple memories (for example, two or more memory cards) through a memory controller. Each memory includes multiple blocks, and the blocks are the smallest units of the memory accessible by the host through the memory controller. For example, a first memory includes M first blocks and a second memory includes N second blocks, where M and N are each an integer greater than 1. Therefore, the memory controller accesses two separate memories, but for the host that communicates with the memory controller, disk logical addresses that are accessed by the host can be indexed from 0 to M+N−1.

Furthermore, the existing memory controller can correlate the M first blocks of the first memory to M disk logical addresses indexed from 0 to M−1, and then correlate the N second blocks of the second memory to N disk logical addresses indexed from M to M+N−1. In other words, the existing technology sorts the M first blocks and the N second blocks to correlate to multiple disk logical addresses indexed from 0 to M+N−1 by first sorting the M first blocks and then sorting the N second blocks in succession. Therefore, the M first blocks of the first memory and the N second blocks of the second memory are sorted sequentially in succession under the multiple disk logical addresses that are sequentially arranged.

However, when the data transfer rate between the host and the memory controller is greater than the data transfer rate between the memory controller and a single memory, and the host only needs to access X first blocks corresponding to X disk logical addresses indexed from 0 to X (X<M−1), only the first memory is accessed and the second memory is idle (i.e., the data transfer rate between the memory controller and the second memory is 0). As a result, multiple memories are underutilized and the maximum access rate of the entire system is the data transfer rate between the memory controller and the first memory, such that the access performance of the system is decreased.

SUMMARY OF THE DISCLOSURE

In response to the above-referenced technical inadequacies, the present disclosure provides a method and a memory controller for accessing a plurality of memories, so that when a host accesses a plurality of blocks, a first memory and a second memory are equally accessed. Therefore, a utilization rate of the plurality of memories and an access performance of the system can be effectively increased.

In one aspect, the present disclosure provides a method for accessing a plurality of memories. The data access method is applied to a memory controller. The memory controller is coupled between a host and the plurality of memories, and each of the plurality of memories includes a plurality of blocks. The method includes the following steps: sorting the plurality of blocks of the plurality of memories for corresponding to a plurality of disk logical addresses that are sequentially sorted; the plurality of blocks of the plurality of memories including M first blocks of a first memory and N second blocks of a second memory, where M and N are each an integer greater than 1, and the M first blocks of the first memory and the N second blocks of the second memory in the plurality of disk logical addresses are sorted in a non-sequential successive order; and executing an access operation according to a result of the sorting operation, so as to access the first memory and the second memory substantially simultaneously.

In certain embodiments, the M first blocks of the first memory and the N second blocks of the second memory in the plurality of disk logical addresses are alternately sorted.

In certain embodiments, the access operation includes a writing operation that includes the following steps: receiving a writing data and a writing address generated by the host, the writing address including a plurality of first disk logical addresses of the plurality of disk logical addresses; and according to the result of the sorting operation, writing the writing data to the plurality of blocks of the first memory and the second memory that correspond to the plurality of first disk logical addresses.

In certain embodiments, the access operation includes a reading operation that includes the following steps: receiving a reading address generated by the host, wherein the reading address includes a plurality of second disk logical addresses of the plurality of disk logical addresses; and according to the result of the sorting operation, transmitting data stored at the plurality of blocks of the first memory and the second memory that correspond to the plurality of second disk logical addresses to the host.

In certain embodiments, in response to M being equal to N, the memory controller alternately sorts the M first blocks and the N second blocks by a 1:1 ratio to correspond to the plurality of disk logical addresses.

In certain embodiments, in response to M being greater than N, the memory controller alternately sorts a first one to an Nth one of the M first blocks and the N second blocks by a 1:1 ratio to correspond to a first to a 2Nth one of the plurality of disk logical addresses.

In certain embodiments, the memory controller sorts the plurality of blocks of the plurality of memories in the non-sequential successive order according to at least one of a block number ratio and an access rate ratio of the plurality of memories.

In another aspect, the present disclosure provides a memory controller for accessing a plurality of memories. The data access device includes a first interface circuit, a second interface circuit, and a memory controlling circuit. The first interface circuit is configured to couple to a host.

The second interface circuit is configured to couple to the plurality of memories. Each of the plurality of memories includes a plurality of blocks. The memory controlling circuit is coupled between the first interface circuit and the second interface circuit. The memory controlling circuit is configured to execute steps as follows: sorting the plurality of blocks of the plurality of memories to correspond to a plurality of disk logical addresses that are sequentially sorted; the plurality of blocks of the plurality of memories including M first blocks of a first memory and N second blocks of a second memory, where M and N are each an integer greater than 1, and the M first blocks of the first memory and the N second blocks of the second memory in the plurality of disk logical addresses are sorted in a non-sequential successive order; and executing an access operation according to a result of the sorting operation, so as to access the first memory and the second memory substantially simultaneously.

In certain embodiments, each of the plurality of memories is an embedded multimedia card (eMMC), the second interface circuit includes two eMMC interfaces, and the memory controlling circuit is coupled to the first memory and the second memory respectively through the two eMMC interfaces.

Therefore, one of the advantageous effects of the present disclosure is that, in the method and the memory controller provided by the present disclosure, the memory control circuit sorts the M first blocks of the first memory and the N second blocks of the second memory in a non-sequential successive order to correspond to the plurality of disk logical addresses that are sequentially sorted, so that when a host accesses a plurality of blocks, a first memory and a second memory are equally accessed. Therefore, a utilization rate of the plurality of memories and an access performance of the system can be increased.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 1:
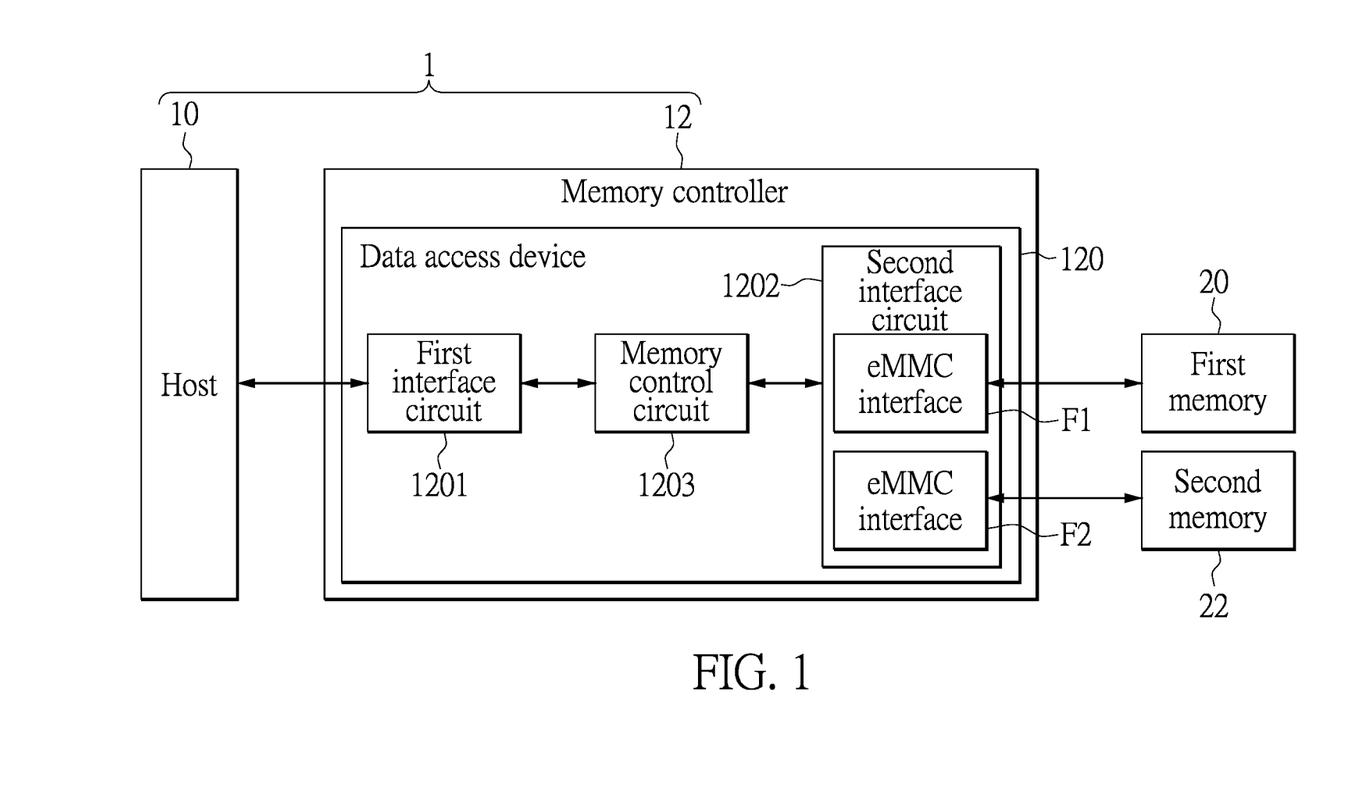
FIG. 1 is a functional block diagram of a data access device according to the present disclosure.

Referring to FIG. 1, FIG. 1 is a functional block diagram of a data access device according to the present disclosure. As shown in FIG. 1, embodiments of the present disclosure provide a data access device 120 for a memory controller 12 to access a plurality of memories. The data access device 120 includes a first interface circuit 1201, a second interface circuit 1202, and a memory controlling circuit 1203. The first interface circuit 1201 is configured to couple to a host 10. The second interface circuit 1202 is configured to couple to the plurality of memories. Each of the plurality of memories includes a plurality of blocks. Each of the blocks is a minimal unit by which the host 10 accesses the memory through the memory controller 12. The memory controlling circuit 1203 is coupled between the first interface circuit 1201 and the second interface circuit 1202.

In the following descriptions, the plurality of memories in the present disclosure can be a first memory 20 and a second memory 22, but a specific quantity of the plurality of memories is not limited in the present disclosure. The plurality of blocks of the plurality of memories include M first blocks of the first memory 20 and N second blocks of the second memory 22, where M and N are each an integer greater than 1.

Each of the plurality of memories can be an embedded multimedia card (eMMC), but the present disclosure is not limited thereto. Correspondingly, the second interface circuit 1202 can be two eMMC interfaces (e.g., an eMMC interface F1 and an eMMC interface F2), and the memory controlling circuit 1203 is coupled to the first memory 20 and the second memory 22 respectively through the two eMMC interfaces F1 and F2. Therefore, the memory controller 12 may access two separate memories.

Furthermore, the memory controlling circuit 1203 can include a general microprocessor or a dedicated microcontroller (that are not shown in FIG. 1) for managing access and operation on the first memory 20 and the second memory 22, and the host 10 can be connected to the memory controlling circuit 1203 by using the first interface circuit 1201, but the present disclosure is not limited thereto. It should be noted that, the host 10 accesses the first memory 20 and the second memory 22 as if accessing a single memory (e.g., a disk), and a data transfer rate between the host 10 and the memory controller 12 is greater than a data transfer rate between the memory controller 12 and a single memory.

Figure 2:
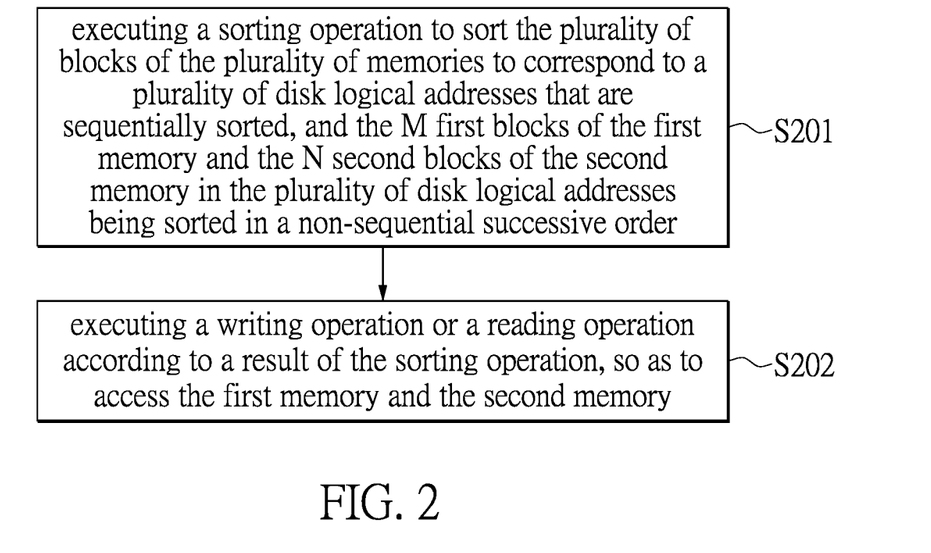
FIG. 2 is a flowchart of a data access method according to the present disclosure.

Specifically, the memory controlling circuit 1203 is configured to execute a data access method of the present disclosure. In other words, the data access method of the present disclosure is applied to a data access system 1 including the host 10 and the memory controller 12. Reference is further made to FIG. 2. FIG. 2 is a flowchart of the data access method according to the present disclosure. As shown in FIG. 2, the data access method of the present disclosure includes the following steps.

Step S201: executing a sorting operation to sort the plurality of blocks of the plurality of memories to correspond to a plurality of disk logical addresses that are sequentially sorted, in which the M first blocks of the first memory 20 and the N second blocks of the second memory 22 in the plurality of disk logical addresses are sorted in a non-sequential successive order. For example, the M first blocks of the first memory 20 and the N second blocks of the second memory 22 are alternately sorted.

Step S202: executing a writing operation or a reading operation according to a result of the sorting operation, so as to access the first memory 20 and the second memory 22.

For example, the memory controlling circuit 1203 can sort the M first blocks of the first memory 20 and the N second blocks of the second memory 22 to correspond to M+N disk logical addresses DLBA[0] to DLBA[M+N−1] that are indexed to be from 0 to M+N−1.

Furthermore, as mentioned above, the first memory 20 and the second memory 22 are two separate memories. In addition, in the follow description, the M first blocks of the first memory 20 can correspond to M first card logical addresses CLBA1[0] to CLBA1[M−1] that are indexed to be from 0 to M−1, and the N second blocks of the second memory 22 can correspond to N second card logical addresses CLBA2[0] to CLBA2[N−1] that are indexed to be from 0 to N−1.

Figure 3:
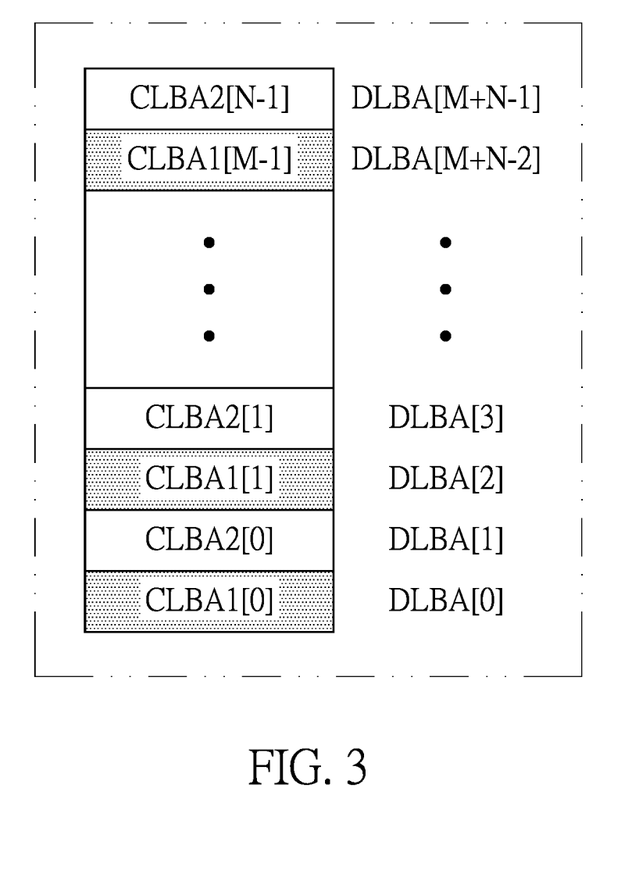
FIG. 3 is a schematic view of sorting M first blocks of a first memory and N second blocks of a second memory to correspond to a plurality of disk logical addresses that are sequentially sorted according to a first embodiment of the present disclosure.
Figure 4:
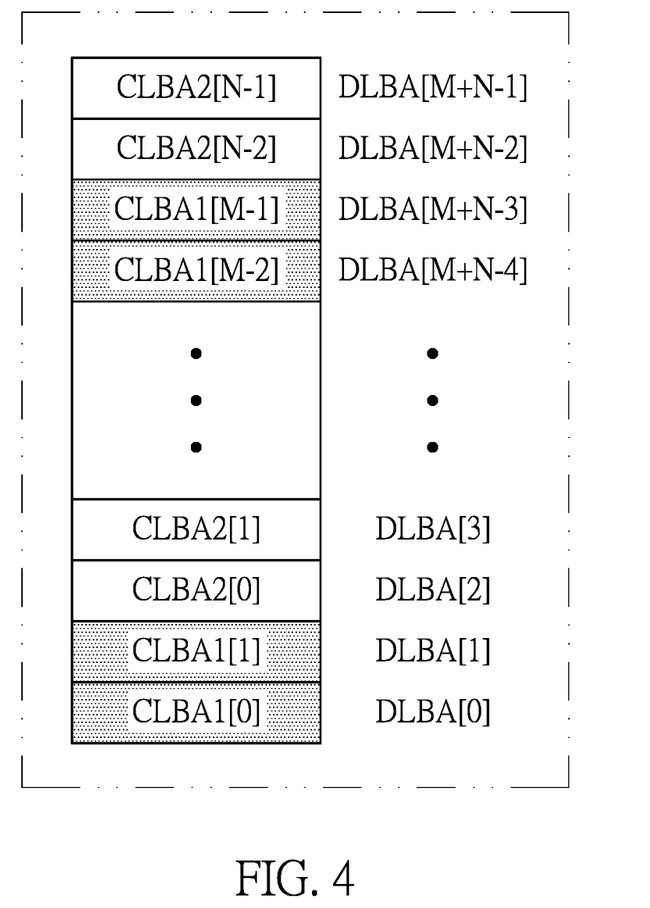
FIG. 4 is a schematic view of sorting the M first blocks of the first memory and the N second blocks of the second memory to correspond to the plurality of disk logical addresses that are sequentially sorted according to a second embodiment of the present disclosure.
Figure 5:
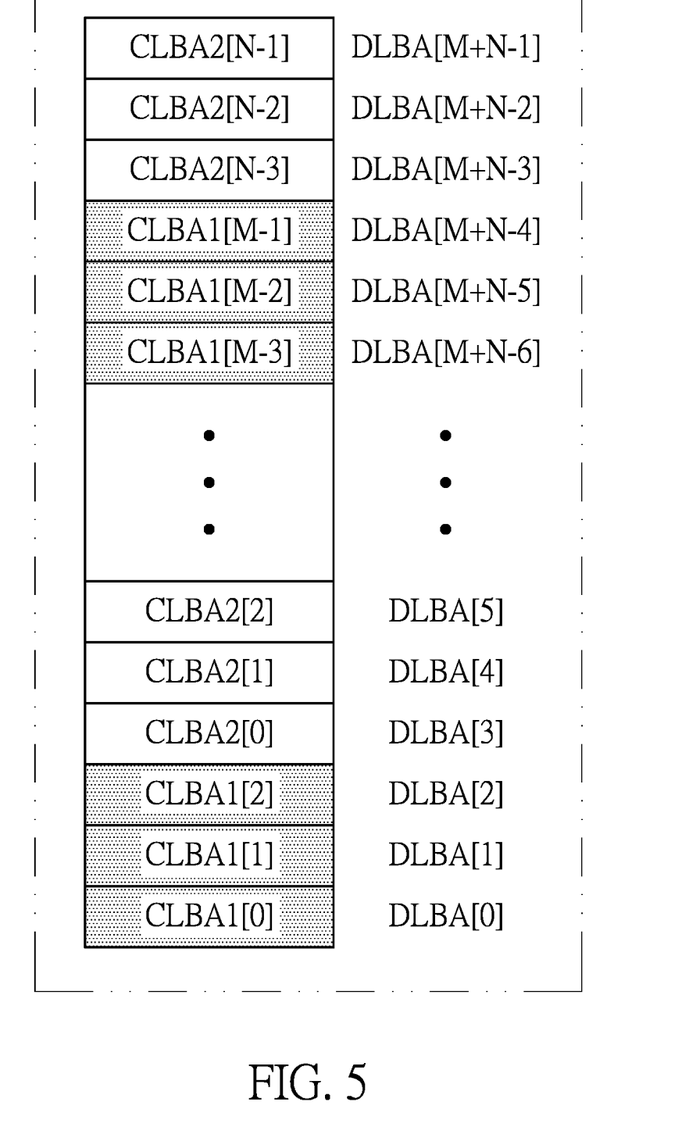
FIG. 5 is a schematic view of sorting the M first blocks of the first memory and the N second blocks of the second memory to correspond to the plurality of disk logical addresses that are sequentially sorted according to a third embodiment of the present disclosure.

In addition, in response to M being equal to N, the memory controlling circuit 1203 alternately sorts the M first blocks and the N second blocks by a 1:1 ratio to correspond to the plurality of disk logical addresses DLBA[0] to DLBA[M+N−1], but the present disclosure is not limited thereto. Referring to FIG. 3 and in conjunction with FIG. 4 and FIG. 5, FIG. 3, FIG. 4, and FIG. 5 are schematic views of sorting the M first blocks of the first memory and the N second blocks of the second memory to correspond to a plurality of disk logical addresses that are sequentially sorted according to first, second, and third embodiments of the present disclosure.

As shown in FIG. 3, after the memory controlling circuit 1203 alternately sorts the M first blocks and the N second blocks by a 1:1 ratio, the first block of the first card logical address CLBA1[0] can correspond to the disk logical address DLBA[0] that is indexed as 0, and the second block of the second card logical address CLBA2[0] can correspond to the disk logical address DLBA[1] that is indexed as 1. Therefore, the first block of the first card logical address CLBA1[M−1] can correspond to the disk logical address DLBA[M+N−2] that is indexed as M+N−2, and the second block of the second card logical address CLBA2[N−1] can correspond to the disk logical address DLBA[M+N−1] that is indexed as M+N−1.

In other words, in the first embodiment of the present disclosure, the memory controlling circuit 1203 alternately sorts the M first blocks of the first memory 20 and the N second blocks of the second memory 22 with a single block as a basic unit. Therefore, when the host 10 accesses the two blocks that correspond to the two disk logical addresses DLBA[0] to DLBA[1] that are indexed as 0 to 1, both the first memory 20 and the second memory 22 are accessed, so that a utilization rate of the two memories are increased. At this time, a maximum transmission rate of the system can be approximate to a minimum of a sum of a data transmission rate between the host 10 and the memory controller 12 and a data transmission rate between the memory controller 12 and the two memories. That is, an access performance of the system at this time is more optimal than an access performance of a system in the conventional technology, so that the access performance of the system is increased in the present disclosure.

It should be noted that, the present disclosure is not limited to the memory controlling circuit 1203 alternately sorting the M first blocks of the first memory 20 and the N second blocks of the second memory 22 with a single block as a basic unit. The memory controlling circuit 1203 can alternately sort the M first blocks of the first memory 20 and the N second blocks of the second memory 22 with multiple blocks as a basic unit.

As shown in FIG. 4, after the memory controlling circuit 1203 alternately sorts the M first blocks and the N second blocks by a 1:1 ratio, the first blocks of the first card logical addresses CLBA1[0] to CLBA1[1] can correspond to the disk logical addresses DLBA[0] to DLBA[1] that are indexed as 0 to 1, and the second blocks of the second card logical addresses CLBA2[0] to CLBA2[1] can correspond to the disk logical addresses DLBA[2] to DLBA[3] that are indexed as 2 to 3. Therefore, the first blocks of the first card logical addresses CLBA1[M−2] to CLBA1[M−1] can correspond to the disk logical addresses DLBA[M+N−4] to DLBA[M+N−3] that are indexed as M+N−4 to M+N−3, and the second blocks of the second card logical addresses CLBA2[N−2] to CLBA2[N−1] can correspond to the disk logical addresses DLBA[M+N−2] to DLBA[M+N−1] that are indexed as M+N−2 to M+N−1.

In other words, in the second embodiment of the present disclosure, the memory controlling circuit 1203 alternately sorts the M first blocks of the first memory 20 and the N second blocks of the second memory 22 with two blocks as a basic unit. Therefore, when the host 10 accesses the two blocks that correspond to the two disk logical addresses DLBA[1] to DLBA[2] that are indexed as 1 to 2, both the first memory 20 and the second memory 22 can be accessed, so that a utilization rate of the two memories and an access performance of the system are increased.

Similarly, as shown in FIG. 5, after the memory controlling circuit 1203 alternately sorts the M first blocks and the N second blocks by a 1:1 ratio, the first blocks of the first card logical addresses CLBA1[0] to CLBA1[2] can correspond to the disk logical addresses DLBA[0] to DLBA[2] that are indexed as 0 to 2, and the second blocks of the second card logical addresses CLBA2[0] to CLBA2[2] can correspond to the disk logical addresses DLBA[3] to DLBA[5] that are indexed as 3 to 5. Therefore, the first blocks of the first card logical addresses CLBA1[M-3] to CLBA1[M-1] can correspond to the disk logical addresses DLBA[M+N-6] to DLBA[M+N-4] that are indexed as M+N-6 to M+N-4, and the second blocks of the second card logical addresses CLBA2[N-3] to CLBA2[N-1] can correspond to the disk logical addresses DLBA[M+N-3] to DLBA[M+N-1] that are indexed as M+N-3 to M+N-1.

In other words, in the third embodiment of the present disclosure, the memory controlling circuit 1203 alternately sorts the M first blocks of the first memory 20 and the N second blocks of the second memory 22 with three blocks as a basic unit. Therefore, when the host 10 accesses the two blocks that correspond to the two disk logical addresses DLBA[2] to DLBA[3] that are indexed as 2 to 3, both the first memory 20 and the second memory 22 can be accessed, so that a utilization rate of the two memories and an access performance of the system are increased.

Figure 6:
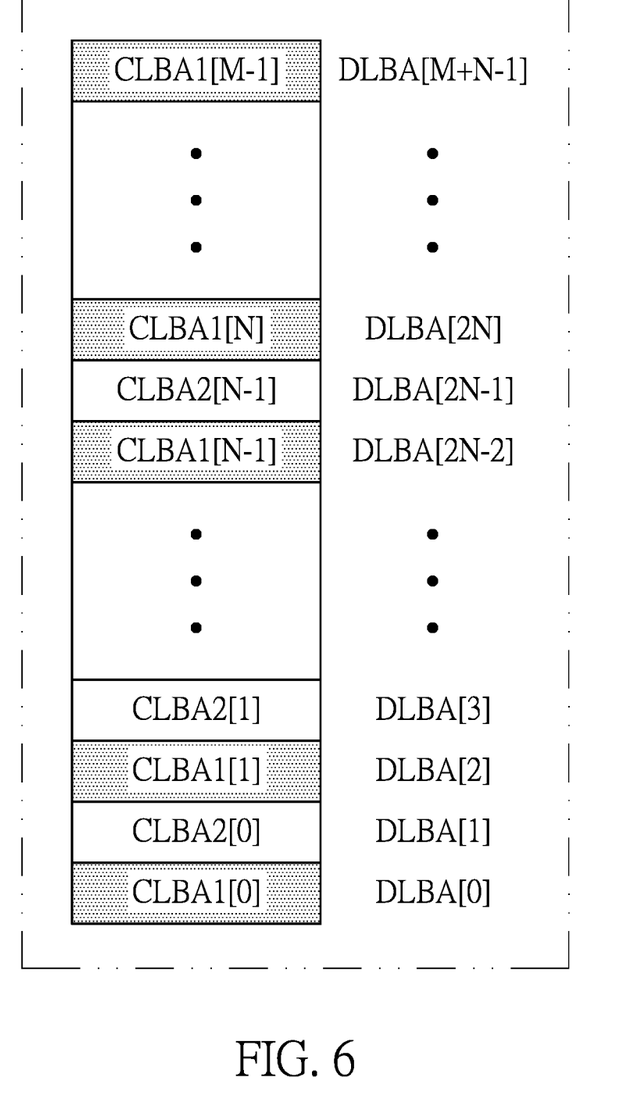
FIG. 6 is a schematic view of sorting the M first blocks of the first memory and the N second blocks of the second memory to correspond to the plurality of disk logical addresses that are sequentially sorted according to a fourth embodiment of the present disclosure.

On the other hand, in response to M being greater than N, the memory controlling circuit 1203 can alternately sort a first one to an Nth one of the M first blocks and the N second blocks by a 1:1 ratio to correspond to the disk logical addresses DLBA[0] to DLBA[2N-1], but the present disclosure is not limited thereto. Referring to FIG. 6, FIG. 6 is a schematic view of sorting the M first blocks of the first memory and the N second blocks of the second memory to correspond to a plurality of disk logical addresses that are sequentially sorted according to a fourth embodiment of the present disclosure.

As shown in FIG. 6, after the memory controlling circuit 1203 alternately sorts the first one to the Nth one of the first blocks and the N second blocks by a 1:1 ratio, the first block of the first card logical address CLBA1[0] can correspond to the disk logical address DLBA[0] that is indexed as 0, and the second block of the second card logical address CLBA2[0] can correspond to the disk logical address DLBA[1] that is indexed as 1. Therefore, the first block of the first card logical address CLBA1[N-1] can correspond to the disk logical address DLBA[2N-2] that is indexed as 2N-2, and the second block of the second card logical address CLBA2[N-1] can correspond to the disk logical address DLBA[2N-1] that is indexed as 2N-1.

In other words, in the fourth embodiment of the present disclosure, the memory controlling circuit 1203 can first alternately sort the first one to the Nth one of the first blocks and the N second blocks with a single block as a basic unit. Then, after the N second blocks are sorted, the memory controlling circuit 1203 then can successively sort the first blocks of the first card logical addresses CLBA1[N] to CLBA1[M-1] to correspond to the disk logical addresses DLBA[2N] to DLBA[M+N-1], as shown in FIG. 6.

It should be noted that, the present disclosure is not limited to the memory controlling circuit 1203 alternately sorting the first one to the Nth one of the first blocks and the N second blocks with a single block as a basic unit. The memory controlling circuit 1203 can alternately sort the first one to the Nth one of the first blocks and the N second blocks with multiple blocks as a basic unit. Details thereof are similar to that mentioned in the above descriptions, and will not be reiterated herein.

Figure 7:
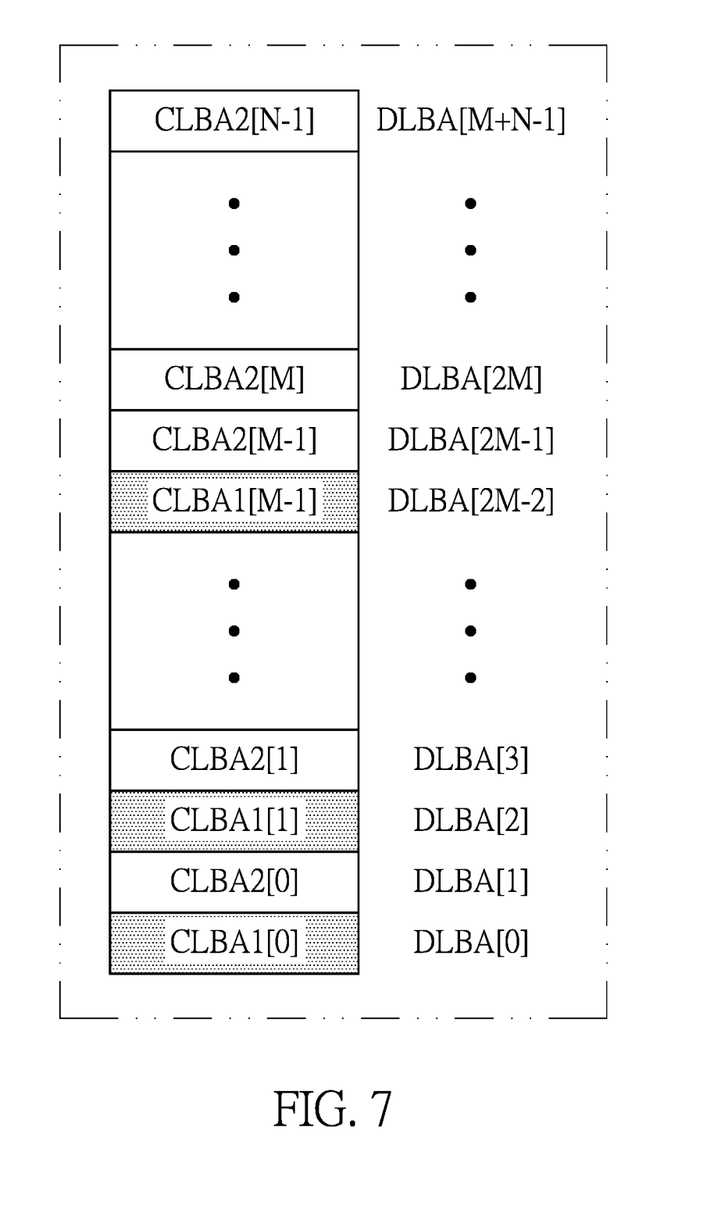
FIG. 7 is a schematic view of sorting the M first blocks of the first memory and the N second blocks of the second memory to correspond to the plurality of disk logical addresses that are sequentially sorted according to a fifth embodiment of the present disclosure.

Similarly, in response to M being smaller than N, the memory controlling circuit 1203 can alternately sort the M first blocks and a first one to an Mth one of the N second blocks by a 1:1 ratio to correspond to the disk logical addresses DLBA[0] to DLBA[2M-1]. Referring to FIG. 7, FIG. 7 is a schematic view of sorting the M first blocks of the first memory and the N second blocks of the second memory to correspond to a plurality of disk logical addresses that are sequentially sorted according to a fifth embodiment of the present disclosure.

As shown in FIG. 7, after the memory controlling circuit 1203 alternately sorts the M first blocks and the first one to the Mth one of the second blocks by a 1:1 ratio, the first block of the first card logical address CLBA1[0] can correspond to the disk logical address DLBA[0] that is indexed as 0, and the second block of the second card logical address CLBA2[0] can correspond to the disk logical address DLBA[1] that is indexed as 1. Therefore, the first block of the first card logical address CLBA1[M-1] can correspond to the disk logical address DLBA[2M-2] that is indexed as 2M-2, and the second block of the second card logical address CLBA2[M-1] can correspond to the disk logical address DLBA[2M-1] that is indexed as 2M-1.

In other words, in the fifth embodiment of the present disclosure, the memory controlling circuit 1203 can first alternately sort the M first blocks and the first one to the Mth one of the second blocks with a single block as a basic unit. Then, after the M first blocks are sorted, the memory controlling circuit 1203 then can successively sort the second blocks of the second card logical addresses CLBA2[M] to CLBA2[N-1] to correspond to the disk logical addresses DLBA[2M] to DLBA[M+N-1], as shown in FIG. 7.

It should be noted that, the present disclosure is not limited to the memory controlling circuit 1203 alternately sorting the M first blocks and the first one to the Mth one of the second blocks with a single block as a basic unit. The memory controlling circuit 1203 can alternately sort the M first blocks and the first one to the Mth one of the second blocks with multiple blocks as a basic unit. Details thereof are similar to that mentioned in the above descriptions, and will not be reiterated herein.

Specifically, comparing to the conventional technologies, when the M first blocks and the N second blocks are sorted in the present disclosure to correspond to the plurality of disk logical addresses that are sequentially sorted, the M first blocks and the N second blocks are alternately sorted.

On the other hand, in a plurality of memories, a number of the blocks (such as M and N) may be different, and a data transmission rate (i.e., an access rate) may be different between a memory controller and each of the plurality of memories. Therefore, the memory controlling circuit 1203 can sort the plurality of blocks of the plurality of memories in a non-sequential successive order according to one or a combination of a block number ratio and an access rate ratio of the plurality of memories.

For example, a value of M is twice a value of N, and a data transmission rate between the memory controller 12 and the first memory 20 is also twice a data transmission rate between the memory controller 12 and the second memory 22. Therefore, before performing the sorting operation, the memory controlling circuit 1203 can be further configured to obtain a block number ratio of the first memory 20 to the second memory 22 that is 2:1, and obtain an access rate ratio of the first memory 20 to the second memory 22 that is 2:1. Then, the memory controlling circuit 1203 can alternately sort the M first blocks and the N second blocks by a 2:1 ratio to correspond to the plurality of disk logical addresses DLBA[0] to DLBA [M+N−1], but the present disclosure is not limited thereto.

Specifically, for a first memory 20 that has a higher block number or a higher access rate, the memory controlling circuit 1203 can use more blocks as a basic unit for the M first blocks, and use less blocks as a basic unit for the N second blocks.

Figure 8:
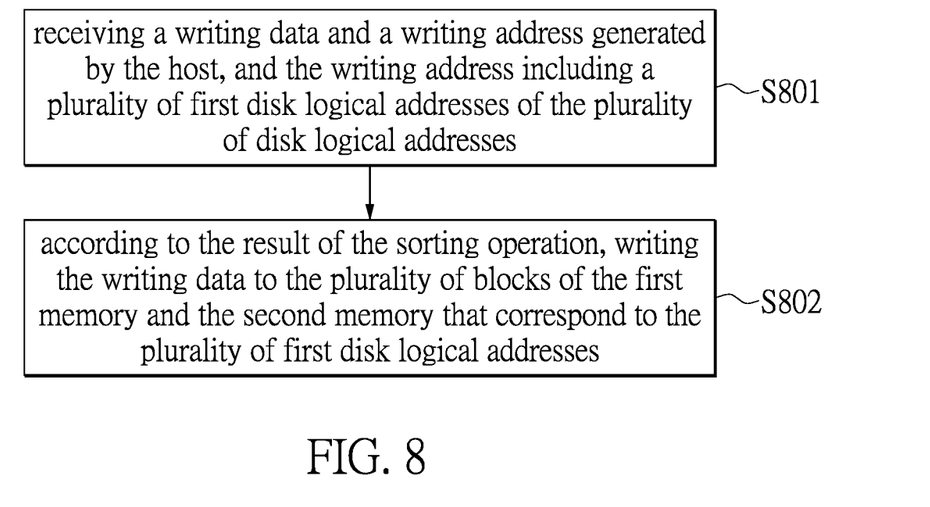
FIG. 8 is a flowchart of a writing operation according to the present disclosure.

On the other hand, reference is made to FIG. 8, in which FIG. 8 is a flowchart of a writing operation according to the present disclosure being executed. As shown in FIG. 8, the memory controlling circuit 1203 is configured to execute the writing operation that includes the following steps.

Step S801: receiving a writing data and a writing address generated by the host 10, in which the writing address includes a plurality of first disk logical addresses of the plurality of disk logical addresses DLBA[0] to DLBA [M+N−1].

Step S802: according to the result of the sorting operation, writing the writing data to the plurality of blocks of the first memory 20 and the second memory 22 that correspond to the plurality of first disk logical addresses.

Figure 9:
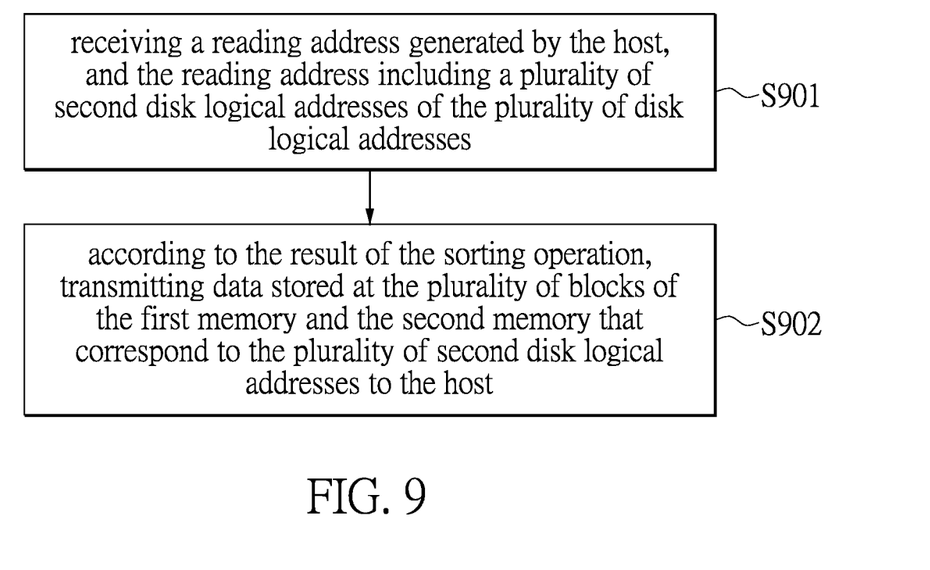
FIG. 9 is a flowchart of a reading operation according to the present disclosure.

Reference can correspondingly be made to FIG. 9, in which FIG. 9 is a flowchart of a reading operation according to the present disclosure being executed. As shown in FIG. 9, the memory controlling circuit 1203 is configured to execute the reading operation that includes the following steps.

Step S901: receiving a reading address generated by the host 10, the reading address including a plurality of second disk logical addresses of the plurality of disk logical addresses DLBA[0] to DLBA [M+N−1].

Step S902: according to the result of the sorting operation, transmitting data stored at the plurality of blocks of the first memory 20 and the second memory 22 that correspond to the plurality of second disk logical addresses to the host.

In conclusion, one of the advantageous effects of the present disclosure is that, in the data access method and the data access device provided by the present disclosure, the memory control circuit sorts the M first blocks of the first memory and the N second blocks of the second memory in a non-sequential successive order to correspond to the plurality of disk logical addresses that are sequentially sorted, so that when a host accesses a plurality of blocks, a first memory and a second memory are equally accessed. Therefore, a utilization rate of the plurality of memories and an access performance of the system can be increased.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for accessing a plurality of memories, applied to a memory controller, the memory controller being coupled between a host and the plurality of memories, and each of the plurality of memories including a plurality of blocks, the method comprising:
    sorting the plurality of blocks of the plurality of memories to correspond to a plurality of disk logical addresses that are sequentially sorted;
    wherein the plurality of blocks of the plurality of memories include M first blocks of a first memory and N second blocks of a second memory, M and N are each an integer greater than 1, and the M first blocks of the first memory and the N second blocks of the second memory in the plurality of disk logical addresses are sorted in a non-sequential successive order; and
    executing an access operation according to a result of the sorting operation, so as to access the first memory and the second memory.

2. The method according to claim 1, wherein the M first blocks of the first memory and the N second blocks of the second memory in the plurality of disk logical addresses are alternately sorted.

3. The method according to claim 1, wherein the access operation comprises a writing operation comprising:
    receiving a writing data and a writing address generated by the host, wherein the writing address includes a plurality of first disk logical addresses of the plurality of disk logical addresses; and
    according to the result of the sorting operation, writing the writing data to the plurality of blocks of the first memory and the second memory that correspond to the plurality of first disk logical addresses.

4. The method according to claim 1, wherein the access operation comprises a reading operation comprising:
    receiving a reading address generated by the host, wherein the reading address includes a plurality of second disk logical addresses of the plurality of disk logical addresses; and
    according to the result of the sorting operation, transmitting data stored at the plurality of blocks of the first memory and the second memory that correspond to the plurality of second disk logical addresses to the host.

5. The method according to claim 1, wherein, in response to M being equal to N, the memory controller alternately sorts the M first blocks and the N second blocks by a 1:1 ratio to correspond to the plurality of disk logical addresses.

6. The method according to claim 1, wherein, in response to M being greater than N, the memory controller alternately sorts a first one to an Nth one of the M first blocks and the N second blocks by a 1:1 ratio to correspond to a first to a 2Nth one of the plurality of disk logical addresses.

7. The method according to claim 1, wherein the memory controller sorts the plurality of blocks of the plurality of memories in the non-sequential successive order according to at least one of a block number ratio and an access rate ratio of the plurality of memories.

8. A memory controller for accessing a plurality of memories, comprising:
    a first interface circuit configured to couple to a host;
    a second interface circuit configured to couple to the plurality of memories, wherein each of the plurality of memories includes a plurality of blocks; and a memory controlling circuit, coupled between the first interface circuit and the second interface circuit, configured to:
sort the plurality of blocks of the plurality of memories to correspond to a plurality of disk logical addresses that are sequentially sorted;
wherein the plurality of blocks of the plurality of memories include M first blocks of a first memory and N second blocks of a second memory, M and N are each an integer greater than 1, and the M first blocks of the first memory and the N second blocks of the second memory in the plurality of disk logical addresses are sorted in a non-sequential successive order; and
execute an access operation according to a result of the sorting operation, so as to access the first memory and the second memory.

9. The memory controller according to claim 8, wherein the access operation comprises a writing operation comprising:
receiving a writing data and a writing address generated by the host, wherein the writing address includes a plurality of first disk logical addresses of the plurality of disk logical addresses; and
according to the result of the sorting operation, writing the writing data to the plurality of blocks of the first memory and the second memory that correspond to the plurality of first disk logical addresses.

10. The memory controller according to claim 8, wherein the access operation comprises a reading operation comprising:
receiving a reading address generated by the host, wherein the reading address includes a plurality of second disk logical addresses of the plurality of disk logical addresses; and
according to the result of the sorting operation, transmitting data stored at the plurality of blocks of the first memory and the second memory that correspond to the plurality of second disk logical addresses to the host.

11. The memory controller according to claim 8, wherein each of the plurality of memories is an embedded multimedia card (eMMC), the second interface circuit includes two eMMC interfaces, and the memory controlling circuit is coupled to the first memory and the second memory respectively through the two eMMC interfaces.

12. The memory controller according to claim 8, wherein, in response to M being equal to N, the memory controller alternately sorts the M first blocks and the N second blocks by a 1:1 ratio to correspond to the plurality of disk logical addresses.

13. The memory controller according to claim 8, wherein, in response to M being greater than N, the memory controller alternately sorts a first one to an Nth one of the M first blocks and the N second blocks by a 1:1 ratio to correspond to a first to a 2Nth one of the plurality of disk logical addresses.

14. The memory controller according to claim 8, wherein the memory controller sorts the plurality of blocks of the plurality of memories in the non-sequential successive order according to a block number ratio of the plurality of memories.

15. The memory controller according to claim 8, wherein the memory controller sorts the plurality of blocks of the plurality of memories in the non-sequential successive order according to a block number ratio and an access rate ratio of the plurality of memories.

16. The memory controller according to claim 8, wherein the memory controller sorts the plurality of blocks of the plurality of memories in the non-sequential successive order according to an access rate ratio of the plurality of memories.

* * * * *